United States Patent
Kallman et al.

(10) Patent No.: US 10,467,629 B2
(45) Date of Patent: *Nov. 5, 2019

(54) SYSTEM AND METHOD FOR CREATING A NEW ACCOUNT IN CRM

(71) Applicant: Veeva Systems Inc., Pleasanton, CA (US)

(72) Inventors: Dan Kallman, Foster City, CA (US); Pengfei Liu, San Ramon, CA (US); Arno Sosna, Pleasanton, CA (US); Jay H Hartley, Dublin, CA (US); Abhay Pimprikar, Campbell, CA (US); Uri Reich, Hamden, CT (US)

(73) Assignee: VEEVA SYSTEMS INC., Pleasanton, CA (US)

( * ) Notice: Subject to any disclaimer, the term of this patent is extended or adjusted under 35 U.S.C. 154(b) by 614 days.

This patent is subject to a terminal disclaimer.

(21) Appl. No.: 14/819,371

(22) Filed: Aug. 5, 2015

(65) Prior Publication Data

US 2016/0321673 A1 Nov. 3, 2016

Related U.S. Application Data

(63) Continuation-in-part of application No. 14/702,307, filed on May 1, 2015, now Pat. No. 9,773,037.

(51) Int. Cl.
  *G06F 16/00* (2019.01)
  *G06Q 30/00* (2012.01)
  *G06F 16/23* (2019.01)

(52) U.S. Cl.
  CPC .......... *G06Q 30/01* (2013.01); *G06F 16/235* (2019.01)

(58) Field of Classification Search
  CPC ......... G06F 17/30365; G06F 17/30371; G06F 17/30; G06F 17/30589; G06F 16/235; G06Q 30/01
  USPC ....................................................... 707/694
  See application file for complete search history.

(56) References Cited

U.S. PATENT DOCUMENTS

| | | | | |
|---|---|---|---|---|
| 7,577,580 B2* | 8/2009 | Hontz | ............... | G06Q 10/0639 |
| | | | | 705/7.38 |
| 8,782,025 B2* | 7/2014 | Swenson | ............... | G06Q 10/10 |
| | | | | 707/692 |
| 2003/0217105 A1* | 11/2003 | Zircher | .................. | G06Q 10/10 |
| | | | | 709/205 |
| 2004/0117358 A1* | 6/2004 | von Kaenel | ...... | G06F 17/30241 |
| 2005/0114240 A1 | 5/2005 | Watson-Luke | | |
| 2009/0276341 A1* | 11/2009 | McMahan | ............. | G06Q 20/10 |
| | | | | 705/30 |
| 2011/0320879 A1* | 12/2011 | Singh | .................... | H04W 24/06 |
| | | | | 714/38.1 |
| 2012/0130853 A1* | 5/2012 | Petri | .................. | G06Q 30/0609 |
| | | | | 705/26.35 |
| 2013/0167196 A1* | 6/2013 | Spencer | .................. | H04W 8/22 |
| | | | | 726/3 |

\* cited by examiner

*Primary Examiner* — Monica M Pyo

(57) ABSTRACT

Systems and methods for processing user requests for creating a new account in a CRM system. When a user requests to create a new account in the CRM system, an unverified account may be created in the CRM and a DCR may be sent to the MDM for verification. Users may interact with the unverified account while waiting for verification result from the MDM.

19 Claims, 10 Drawing Sheets

700

701

| Cancel | | 123 Main St. | | Save |
|---|---|---|---|---|
| Information | | | | |
| Account | John Smith | | Status | Unverified |
| Address line 1 | 123 Main St. | | | |
| Address line 2 | | City | | County |
| Address line 3 | | | | |
| Shipping | ☐ | State | | Lake |
| Mark for Deletion | ☐ | | Zip | NJ |
| Inactive | ☐ | | Local | 07890 |
| License Information | | | | |
| Rep Entered SLN | | | DEA Address? | ☐ |
| License # | 25MB012345679 | | DEA # | |
| License Expiration Date | 5/10/2019 | | DEA Expiration Date | |

⇐ Addre
✎ Edit_Add
🎨 Record a
📖 Launch
🔧 Send to
↻ Last Upd

FIG. 7A

| Cancel | 123 Main St. | | Save |
|---|---|---|---|
| Information | 751 | | |
| Account | John Smith | | |
| Address line 1 | 123 Main St. | | |
| Address line 2 | | City | Lake |
| Address line 3 | | County | |
| Shipping | ☐ | State | NJ |
| Mark for Deletion | ☐ | Zip | 07890 |
| Inactive | ☐ | Local | |
| License Information | | | |
| Rep Entered SLN | | DEA Address? | ☐ |
| License # | 25MB012345679 | DEA # | |
| License Expiration Date | 5/10/2019 | DEA Expiration Date | |

750

- Addre
- Edit_Add
- Record a
- Launch
- Send to
- Last Upd

FIG. 7B

SYSTEM AND METHOD FOR CREATING A NEW ACCOUNT IN CRM

CROSS-REFERENCE TO RELATED APPLICATIONS

The present application is a continuation-in-part of U.S. nonprovisional patent application Ser. No. 14/702,307, filed on May 1, 2015, entitled System and Method for Updating Data in CRM, which is hereby incorporated by reference herein for all purposes.

BACKGROUND

The subject technology relates generally to customer relationship management ("CRM"), and more particularly to enterprise data management, integration and synchronization.

In the pharmaceutical sales industry, sales representatives visit, call or send emails to doctors to communicate product information. Their company employers (e.g., pharmaceutical companies) often use a CRM system to manage the doctors' professional information. It is desirable to update the CRM system in time with correct data to make it more reliable for the sales representatives.

SUMMARY

The disclosed subject matter relates to a method for processing user requests for updating data in a customer relationship management ("CRM") system. The method comprises displaying a first user interface for receiving a first data change request ("DCR") for adding a new account or record to the CRM system in response to a request from a first user. The first data change request comprises a first DCR line for a first type of account information of the new account. The method also comprises: receiving account information of the new account; creating the first data change request and sending the first data change request to the CRM system; sending the first data change request to a master data management system ("MDM") to verify the account information; checking status of the verification in the master data management system; creating an unverified account in the CRM system for the new account before verification of the account information in the MDM system is completed; and recording user interactions with the unverified account in the CRM system before the verification is completed.

BRIEF DESCRIPTION OF THE DRAWINGS

FIGS. 7A and 7B each illustrates an example user interface for an unverified account in the CRM according to one embodiment of the present invention.

DETAILED DESCRIPTION

Figure 1:
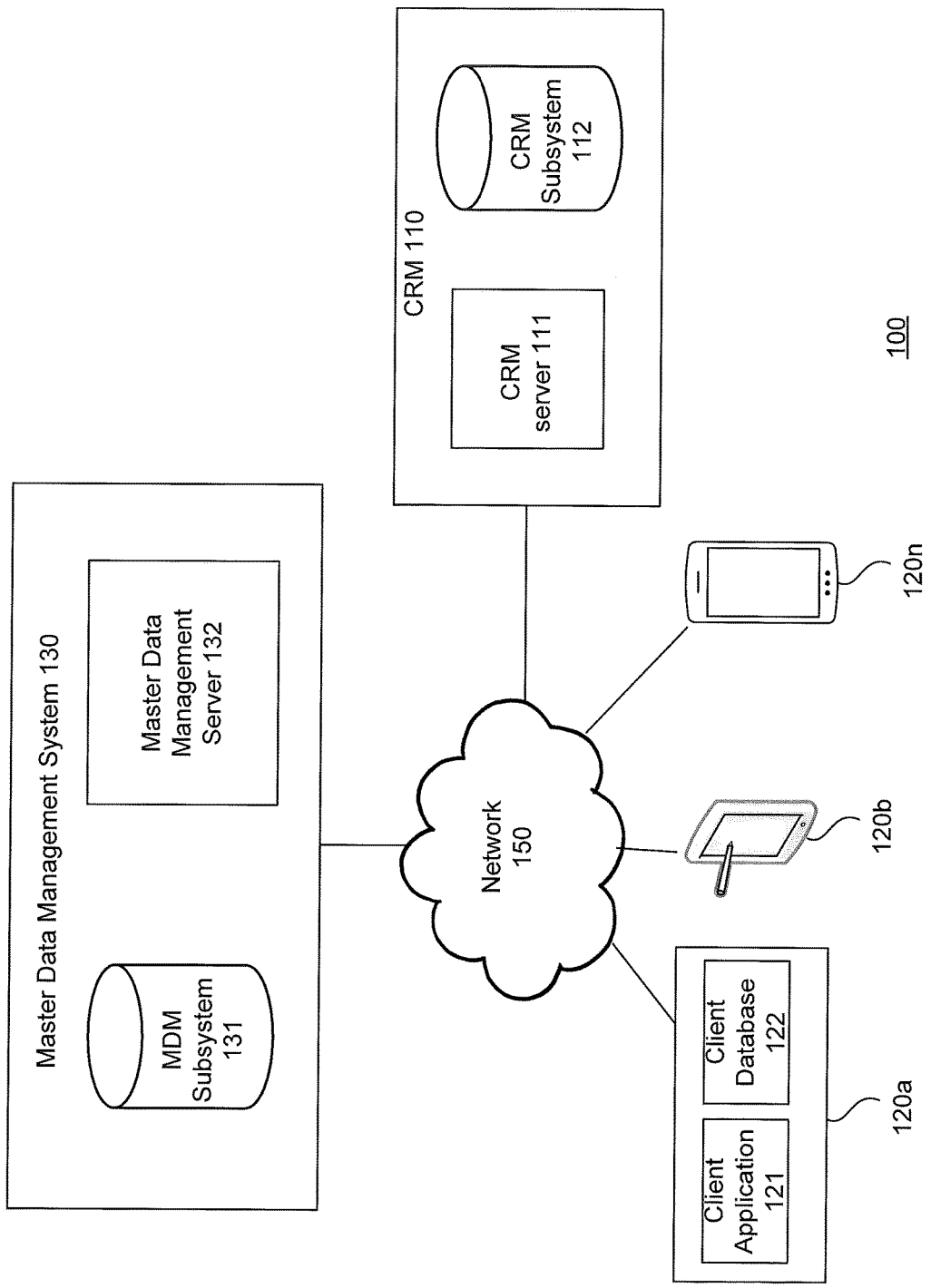
FIG. 1 illustrates an example high level block diagram of an enterprise data management architecture wherein the present invention may be implemented.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The subject technology is directed to techniques for managing, integrating and synchronizing data for an enterprise. A CRM system and a Master Data Management ("MDM") system may be used to hold and manage the enterprise's data. The CRM system may store customer account information for the enterprise. The MDM system may store customer master data for the enterprise, which may include data from an MDM provider. A data steward service may be used to maintain the customer master data in the MDM and make it accurate and up-to-date. Data in the CRM system may include those managed by the MDM system ("master data" or "master record", e.g., account, address and child account) and those not ("non-master data").

A data change request ("DCR") may be generated when a data change in the CRM system may involve master data. A DCR may be a separate and independent object, and may be used for all data changes including, e.g., new record creation, modification of existing record, and deletion of existing record. A DCR may be generated for each separate master data object (e.g., account, address or child account) that is created or edited. A DCR may also be generated for changes to two or more related objects.

Each DCR may have one or more DCR lines. A DCR line may be generated for each data field change and may include a DCR line ID, and the data field's name, old value, new value, final value and validation result. The verification result may include accepting the requested data change, rejecting the requested data change, and partially accepting the requested data change. The final verification result may be populated after the data change is successfully verified in the MDM system.

When a user requests to add a new account for an individual (e.g., a doctor) to the CRM system, a data change request may be sent to the MDM system so that the data steward can verify information of the new account. Around the time the DCR is created, an unverified account for the individual may be created in the CRM system to allow the user to record interactions with the unverified account before verification of the account information in the MDM system is completed. If the account information is correct, the requested data change for the unverified account may be accepted into the MDM, and then update the CRM.

FIG. 1 illustrates an example high level block diagram of an enterprise data management architecture 100 wherein the present invention may be implemented. The enterprise may be a business, or an organization. As shown, the architecture 100 may include a CRM system 110, a plurality of user computing devices 120a, 120b, . . . 120n, and an MDM system 130, coupled to each other via a network 150. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the CRM 110 and the MDM 130 via the network 150, and may be any commercially available computing devices including laptop computers, desktop computers, mobile phones, smart phones, tablet computers, netbooks, and personal digital assistants (PDAs). A client application 121 may run from a user computing device, e.g., 120a, and access data in the MDM 130 and the CRM 110 via the network 150. A client database 122 for the client application 121 may store a subset of the customer's data in the CRM 110 which may be needed to support the operation of the client application 121. The client database 122 may be synchronized with the CRM 110 regularly, when the user computing device is back online, and/or when the user requests for synchronization, while the CRM 110 may be updated with data from the master data management 130. Consequently, customers can access accurate, complete and up-to-date data. User computing devices 120a-120n are illustrated in more detail in FIG. 3.

The CRM 110 may have a CRM server 111 and a CRM subsystem 112. The CRM server 111 is typically a remote computer system accessible over a remote or local network, such as the network 150. The CRM server 111 could be any commercially available computing devices. A client application (e.g., 121) process may be active on one or more user computing devices 120a-120n, and the corresponding server process may be active on the CRM server 111. The client application process and the corresponding server process may communicate with each other and with the master data management 130 over the network 150, thus providing distributed functionality and allowing multiple client applications to take advantage of the information-gathering capabilities of the CRM 110 and the MDM 130. The CRM server 111 may control the method for processing data change requests, as will be described in detail below with reference to FIGS. 6A and 6B.

The CRM subsystem 112 may store data that client applications (e.g., 121) in user computing devices 120a-120n may use. In one embodiment, the CRM subsystem 112 may store data that pharmaceutical companies may need when promoting new products, which may include physician professional information (e.g., name, specialty, license information, affiliated health care organization ("HCO"), contact information at the affiliated HCO, prior interaction record, electronic signature for samples, and medical inquiry submission), product information (e.g., name, category, lot and statistics), sales representative information (e.g., name, territory information, sharing rules and sales reports). It should be understood that the CRM subsystem 112 may store data for other industries.

In one embodiment, the CRM 110 may be a multi-tenant system where various elements of hardware and software of the CRM 110 may be shared by one or more customers. For instance, a server may simultaneously process requests from a plurality of customers, and a database table may store rows for a plurality of customers. In a multi-tenant system, a user is typically associated with a particular customer. In one example, a user could be a sales representative of one of a number of pharmaceutical companies which are tenants, or customers, of the CRM 110.

In one embodiment, the CRM 110 may be a cloud database which runs on a cloud computing platform. Users can run databases on the cloud independently by using a virtual machine image, or purchasing access to a database service maintained by a cloud database provider.

The MDM 130 may include an MDM subsystem 131 and an MDM server 132. The MDM subsystem 131 may store customer master data which may be provided by an MDM provider. The customer master data may be many types of data which may be used by the enterprise, e.g., accounts, addresses and reference data. In one implementation, the MDM subsystem 131 may store verified healthcare provider ("HCP") and/or healthcare organization ("HCO") information for a pharmaceutical company, as the customer. In one example, the MDM subsystem 131 may store verified physician professional information of cardiologists in the U.S. compiled and/or purchased by a pharmaceutical company. Each HCP may be an account in the MDM subsystem 131. The MDM subsystem 131 may be implemented with any commercially available data storage devices. Master data (e.g., account, address and child account) managed by the MDM 130 may be stored in DCR-controlled fields in the CRM subsystem 112.

The master data management server 132 may be used to cleanse, standardize and/or de-duplicate data from different sources to form the single, consolidated customer master data and store the customer master data in the MDM subsystem 131. This may help the enterprise to avoid using multiple and potentially inconsistent versions of the same data. Any changes to the customer master data will be displayed on the data steward interface 1328 shown in FIG. 4, so that a data steward may check the changes and update the customer master data when the changes are verified. The master data management server 132 may further notify the CRM 110 about any updated accounts, so that the CRM 110 may be updated with the changes. The updates may then be synced down to the client database 122. The master data management server 132 may use any commercially available computing devices, and is illustrated in more detail in FIG. 4.

In one implementation, the MDM 130, including the customer master data in the MDM subsystem 131, may be provided to the customer by an MDM provider as a software as a service ("SaaS"). In addition, like the CRM 110, the MDM 130 may be a cloud based multi-tenant system.

Figure 2:
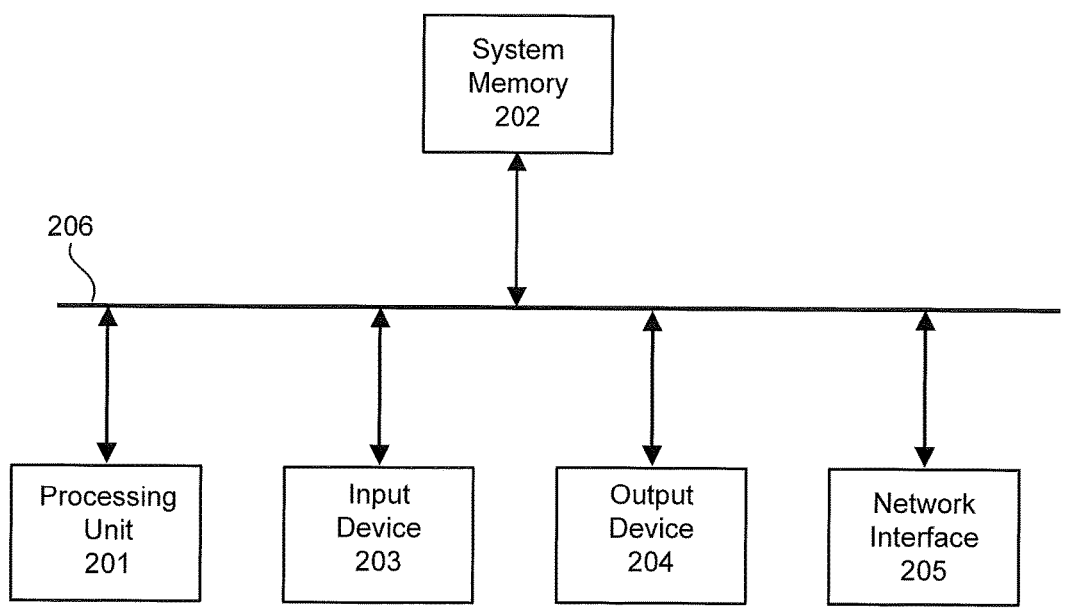
FIG. 2 illustrates an example high level block diagram of a computing device.

FIG. 2 illustrates an example high level block diagram of a computing device 200 which can be used as the user computing devices 120a-120n, the master data management server 132, and/or the CRM server 111 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 204 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
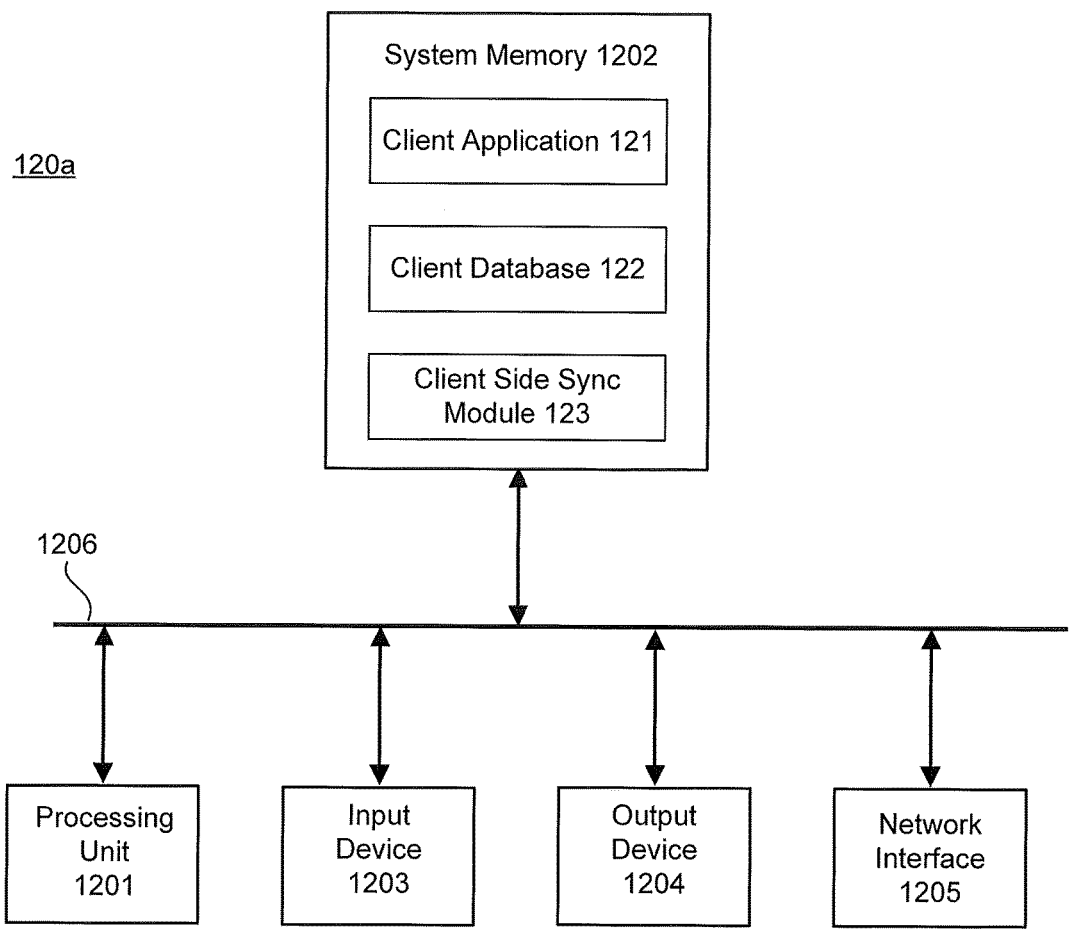
FIG. 3 illustrates an example high level block diagram of a user computing device.

FIG. 3 illustrates an example high level block diagram of a user computing device (e.g., 120*a*) wherein the present invention may be implemented. The user computing device 120*a* may be implemented by the computing device 200 described above, and may have a processing unit 1201, a system memory 1202, an input device 1203, an output device 1204, and a network interface 1205, coupled to each other via a system bus 1206. The client application 121 and the client database 122 may be stored in the system memory 1202. In one embodiment, the client database 122 may be maintained in a local store, e.g., a hard disk, relational store, cache memory, etc. The system memory 1202 may also store a client side sync module 123, which may coordinate with a server side process 1117 (shown in FIG. 5) in the CRM server 111 to facilitate data synchronization between the client database 122 and the CRM 110.

In one implementation, the client database 122 may store a subset of data from the CRM subsystem 112 which may be needed to support the operation of the client application 121. The data in the client database 122 may be associated with a specific user, and only data that the user is allowed to use when running the client application 121 on his/her user computing device 120*a* may be downloaded to the user computing device 120*a* during synchronization with the CRM 110.

Figure 4:
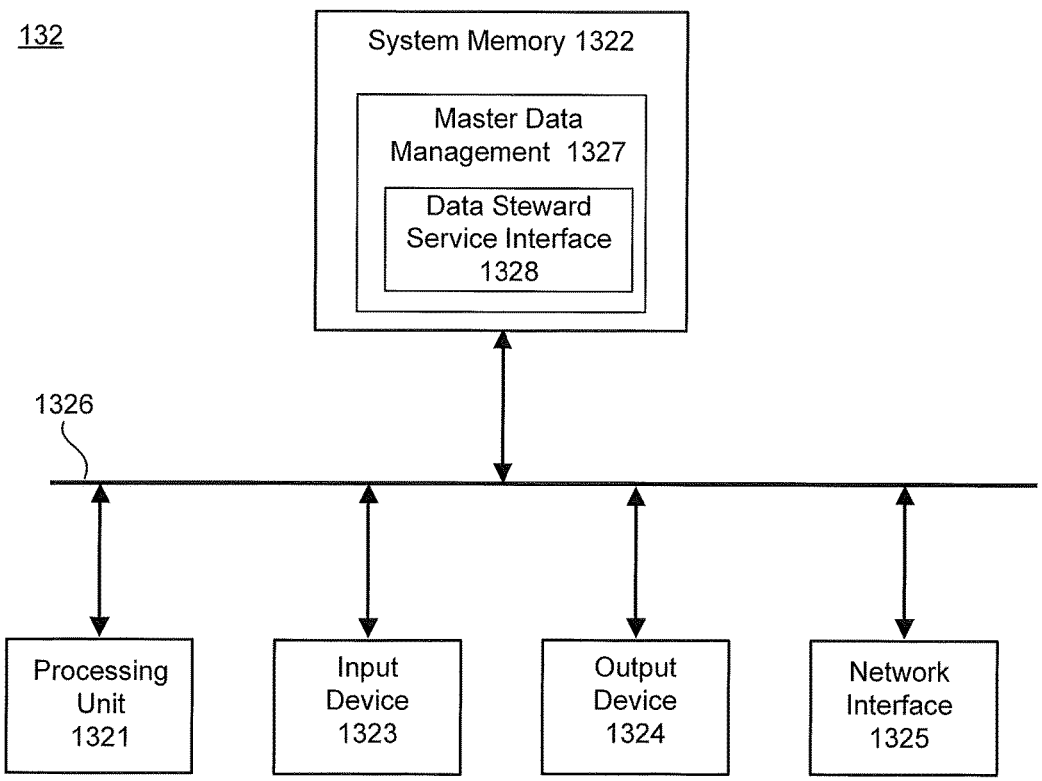
FIG. 4 illustrates an example high level block diagram of an MDM server according to one embodiment of the present invention.

FIG. 4 illustrates an example high level block diagram of the master data management server 132. The master data management server 132 may be implemented by the computing device 200, and may have a processing unit 1321, a system memory 1322, an input device 1323, an output device 1324, and a network interface 1325, coupled to each other via a system bus 1326. The system memory 1322 may store a master data management module 1327, which may be used to cleanse, standardize and de-duplicate HCP and/or HCO data from various sources to form the single, consolidated customer master data.

The master data management module 1327 may control a data steward service interface 1328, which may display records to be verified, merged or updated, receive updates to the customer master data, and store the updates to the MDM subsystem 131.

Figure 5:
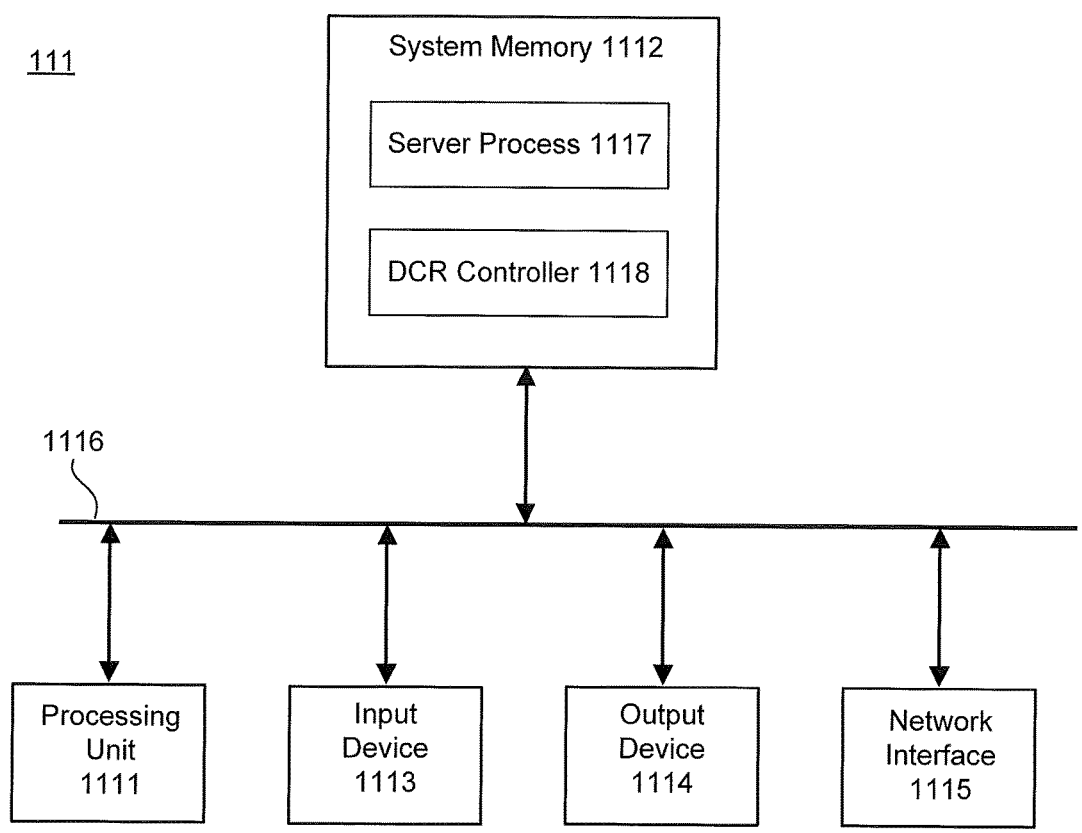
FIG. 5 illustrates an example high level block diagram of a CRM server according to one embodiment of the present invention.

FIG. 5 illustrates an example high level block diagram of the CRM server 111. The CRM server 111 may be implemented by the computing device 200, and may have a processing unit 1111, a system memory 1112, an input device 1113, an output device 1114, and a network interface 1115, coupled to each other via a system bus 1116. The system memory 1112 may store the server process 1117 corresponding to the client application 121 in user computing devices 120*a*-120*n* shown in FIG. 3. The system memory 1112 may also store a DCR controller 1118 which may process user requests for creating a new account as will be described in more detail below with reference to FIGS. 6A and 6B.

It should be appreciated that the DCR controller 1118 may be in a commercially available computing device separated from the CRM server 111.

In one embodiment, the client application 121 is a sales tool for helping sales representatives (i.e., users) of pharmaceutical companies (i.e., customers) to promote products to physicians. Each of the pharmaceutical companies may store physician professional information it collected and/or purchased in the CRM 110, which may be a multi-tenant, cloud based CRM database system. Each pharmaceutical company may manage data availability to its sales representatives by territories, which could be a geographic area or a product. Each sales representative may access data in the CRM 110 of one of the pharmaceutical companies, specifically data for physicians in the territory he/she is assigned.

To enable a sales representative to use the client application 121 even when the user computing devices 120*a*-120*n* are disconnected and provide seamless transition between online and offline use, data relevant to a sales representative's use of the client application 121 may be stored in the client database 122. Such information may include, e.g., data related to the subset of physicians and/or products in his/her territory.

In order to provide a sales representative correct and newest information, and to share new information from a sales representative with other sales representatives in the same pharmaceutical company, client databases 122 on user computing devices 120*a*-120*n* and the CRM 110 need to be synchronized from time to time, which may be carried out by the client side sync module 123 and the server process 1117. The client database 122 and the CRM 110 may be synchronized regularly according to a preset schedule, in response to a user request, and/or when the user computing device 120*a*-120*n* is back online.

The pharmaceutical companies may also purchase service from an MDM provider to use the MDM 130, including the customer master data in the MDM subsystem 131. In one implementation, the MDM subsystem 131 may store address and license information of all physicians in a state, or all physicians with a specialty.

The present invention divides data fields into three groups: DCR-controlled fields, DCR-enabled fields, and CRM-only fields. For the DCR-controlled fields, a DCR is generated and sent to the MDM 130 for verification of each data change and the data change will not be made to the MDM 130 and the CRM 110 until the verification is completed, so that the data in the CRM 110 and the MDM 130 is reliably maintained. For DCR-enabled fields, a DCR is generated and sent to the MDM 130, but data changes may be made to the CRM 110 and the MDM 130 almost in real time since validation is not necessary. For CRM-only data, no DCR is generated and changes may be made to the CRM almost in real time.

Figure 6A:
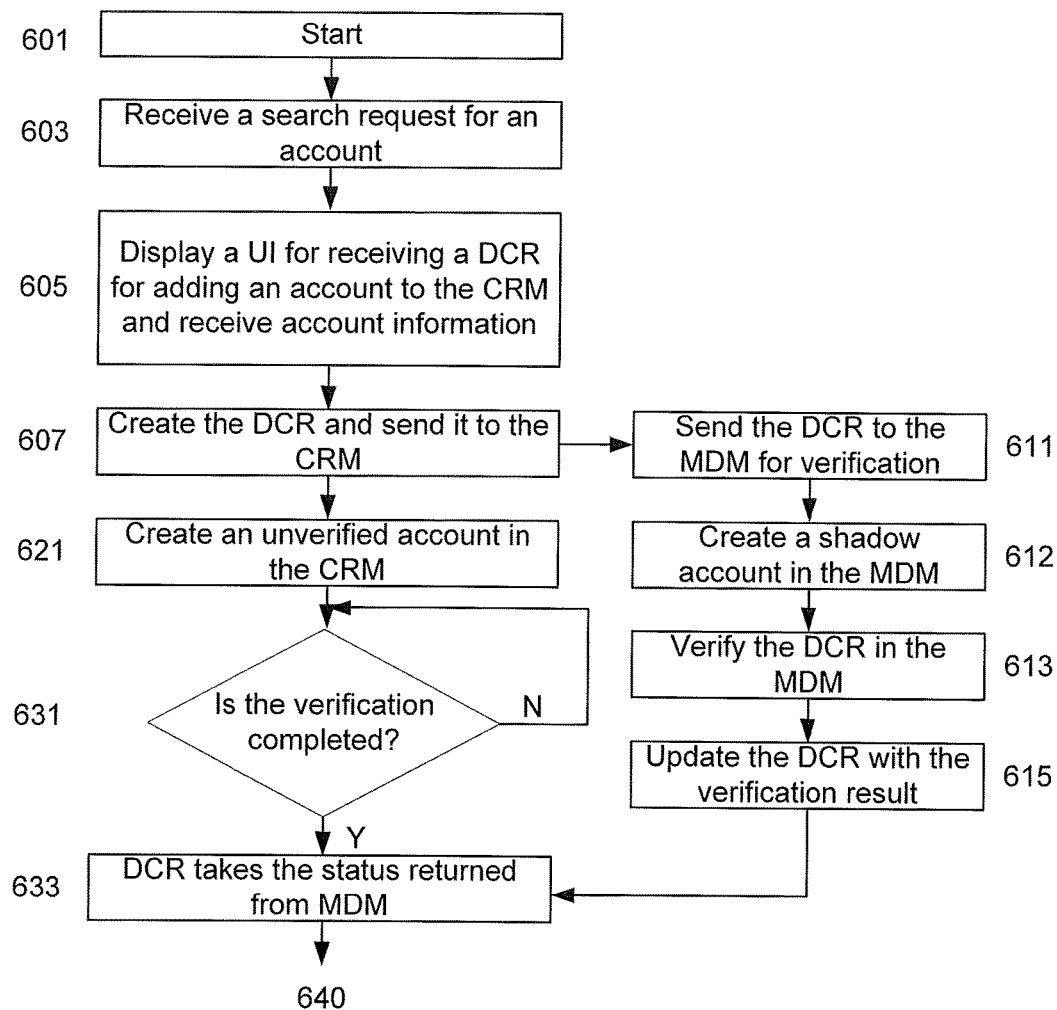
FIGS. 6A and 6B illustrate an example flowchart of a method for processing a user request for creating a new account according to one embodiment of the present invention.
Figure 6B:
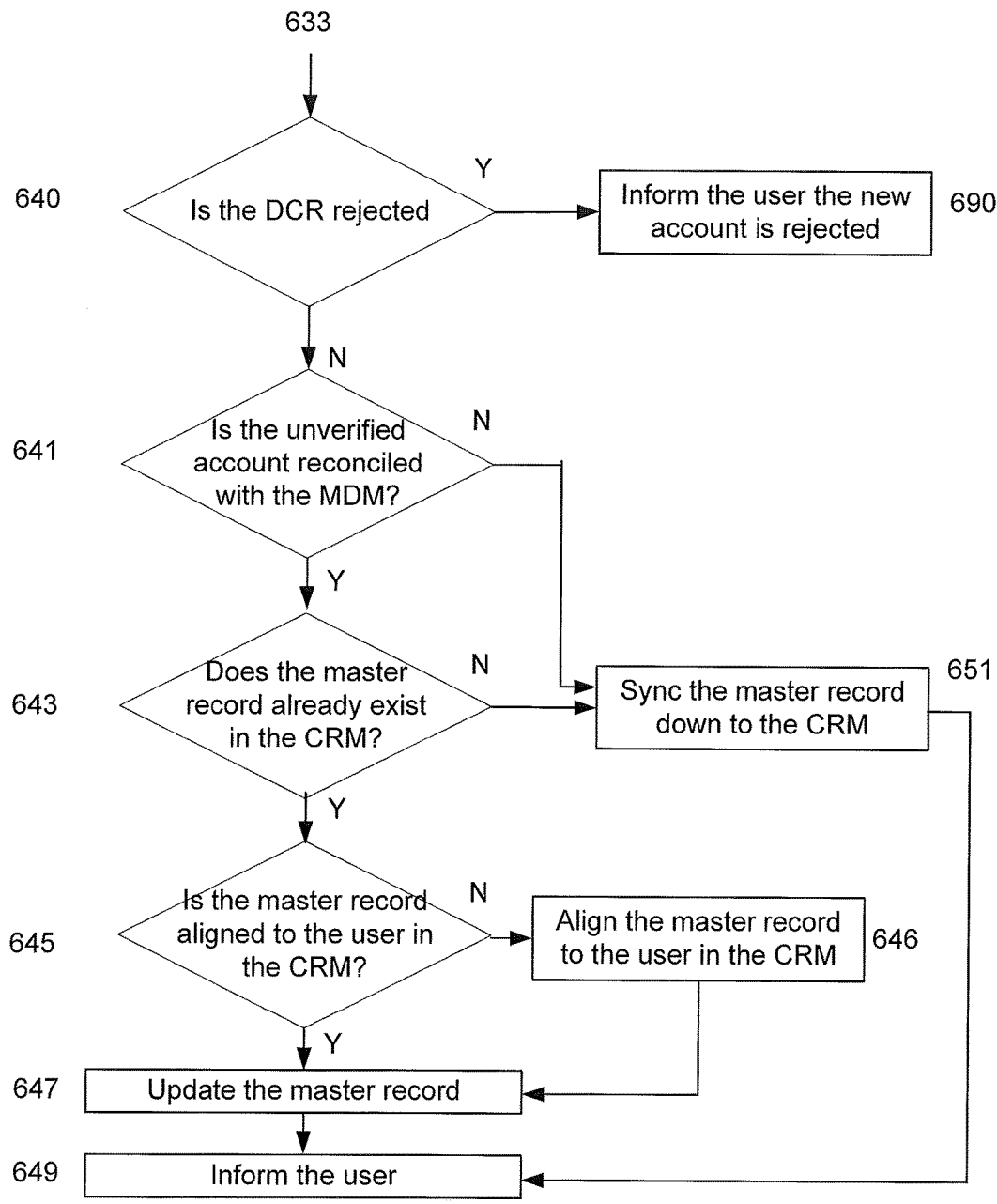

A sales representative may meet a doctor but could not find the doctor in his local database or the CRM 110. The present invention may allow the sales representative to create an account with a special status, e.g., "Unverified", for the doctor in the CRM 110 and send a DCR to the MDM 130 for verification. If the account information in the DCR is verified to be correct, the DCR may be accepted in the MDM 130, with the account information in the DCR being saved as a new master record in the MDM 130 if the doctor is not in the MDM 130, or being reconciled with a master record in the MDM 130 if the doctor is already in the MDM 130 but is not visible to the sales representative. If the account information in the DCR is wrong, the DCR may be rejected by the MDM 130. The CRM 110 may be updated according to the verification result from the MDM 130, including realigning the account with the user's territory in the CRM 110 if the doctor is already in the MDM 130 but is not visible to the user. FIGS. 6A and 6B illustrate an example flowchart of a method for creating a new account according to one embodiment of the present invention. The process may start at 601.

At 603, a user may connect to the network 150, sign in the CRM 110, and then search for an account (e.g., a doctor).

If no valid search result is returned, the user has no visibility of this account. This may be because the account does not exist in the MDM 130, or the account exists in the MDM 130 but is not in the user's territory. At 605, a user interface may be displayed (e.g., by the client application 121) in response to a user request for creating an account, so that the user may input account information. The user interface may have a number of data input areas for receiving the account information. Each data input area may correspond to a data field in the CRM 110. The data field may be, e.g., an account's name, address and license information.

At 607, a DCR may be created and sent to the CRM 110 (e.g., by the client application 121) based on the received account information.

At 611, the DCR may be sent to the MDM 130 (e.g., by DCR controller 1118) for verification. For each account, one DCR may be generated. Each DCR may contain one or more DCR lines. Each DCR line may represent a single field value change request, and may include the field, old value, new value, final value and verification result from the MDM 130.

At 612, a shadow account may be created in the MDM 130 in response to the DCR. The shadow account may be given an ID in the MDM system which indicates that it is not verified yet.

At 613, the DCR may be verified in the MDM 130. In one implementation, a data steward may verify the account information in the DCR from the user. If the account information in the DCR is correct, the DCR may be accepted in the MDM 130, and the shadow account may be saved as a new master record if the doctor is not in the MDM 130, or reconciled with a master record in the MDM 130 if it is for the same doctor but the master record is not visible to the sales representative. If the account information in the DCR is wrong, the DCR may be rejected by the MDM 130 and the shadow account may be removed. The verification process may take one or two business days.

At 615, the DCR may be updated with the verification result, and the process may proceed to 633.

At 621, before the data verification is completed at 615, an unverified account may be created in the CRM 110 and/or the local database 122, so that the user may act immediately to perform transactional actions on the unverified account (e.g., creating calls or recording interactions with the unverified account) without having to wait for the verification result from the MDM 130. The unverified account may be created in the CRM 110 around the time the DCR is created at 607, and could be before or after. The special status "Unverified" may be used to differentiate it from verified data and pending DCRs in the enterprise data management system 100. In addition, before the verification is completed at 615, if other users sync with the CRM 110, the unverified account may be synced down to their local databases. To remind users that an account is an unverified account and the account information is waiting to be verified, the UI for an unverified account may be displayed differently from the verified accounts. In one example, a label "Unverified" 702 may be displayed to mark the account as an unverified account, as shown in FIG. 7A. Alternatively, the doctor's name may be shadowed to indicate that the account is an unverified account, as shown in 751 in FIG. 7B.

In one implementation, the status of the DCR may be communicated to the CRM 110. The CRM 110, or more specifically the DCR controller 1118, may "poll" for status changes, or the MDM 130 may push a notification of the change to the CRM 110. When the CRM 110 determines that the DCR status has changed, it may then retrieve and apply the changes within the CRM 110. At 631, it may be determined (e.g., by the DCR controller 1118) if the verification in the MDM 130 is completed.

If yes, at 633, the DCR may take the status returned from the MDM 130 (e.g., accepted or rejected). The process may proceed to 640.

At 640, the status of the DCR may be checked (e.g., by the DCR controller 1118) to determine if the DCR is rejected. If yes, the user may be informed at 690 that the new account is rejected.

If the DCR is accepted, at 641, it may be determined if the shadow account is being reconciled with a master record in the MDM 130. The shadow account is reconciled with a master record in the MDM 130 if there is a master record in the MDM 130 for the same doctor.

If the shadow account is being reconciled with an existing master record in the MDM 130, it may be determined (e.g., by the DCR controller 1118) if the master record already exists in the CRM 110 at 643.

If the master record already exists in the CRM 110, it may be determined (e.g., by the DCR controller 1118) if the master record is aligned to the user's territory in the CRM 110 at 645.

If the master record in the CRM 110 is not aligned to the user's territory, it may be aligned to the user's territory in the CRM 110 at 646. The process may then proceed to 647. When the master record is aligned to the user's territory, the master record in the MDM 130 may be updated to indicate that the master record exists in the CRM 110 at 647.

At 649, the user may be informed that the new account is verified and visible to him now, and be redirected to the profile page of the new account.

If the DCR is accepted but the shadow account is not being reconciled with the MDM 130 at 641 (which indicates that the MDM 130 does not have a master record for the new account), or the master record does not exist in the CRM 110 at 643 (which indicates that the MDM 130 has a master record for the new account, but the master record is not visible to the user), the master record may be synced down to the CRM 110 from the MDM 130 at 651. The process may then proceed to 649.

Thus, the user may record interactions with the unverified account in the CRM 110 while waiting for the verification result from the MDM 130. If the shadow account in the MDM 130 is accepted in the MDM 130, including being saved as a new master record in the MDM 130 and being reconciled with an existing master record in the MDM 130, interactions with the unverified account may be accepted and saved in the CRM 110.

In addition to creating a new account, the process shown in FIGS. 6A and 6B may be used for other types of records, e.g., Addresses, and Child Accounts (representing relationships between accounts).

Figure 8:
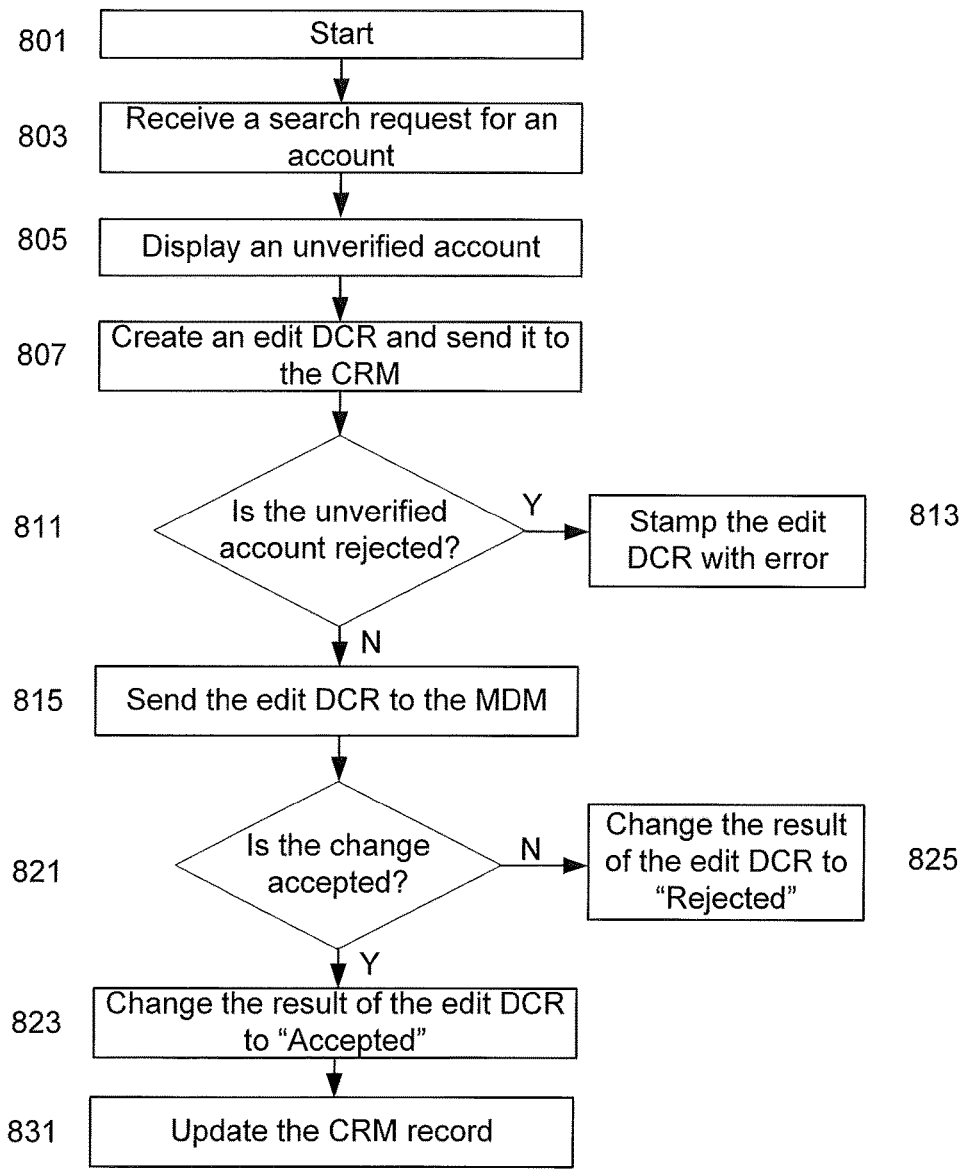
FIG. 8 illustrates an example flowchart of a method for processing a DCR for editing an unverified account according to one embodiment of the present invention.

The present invention may also allow the sales representative and other users to edit the unverified account. FIG. 8 illustrates an example flowchart of a method for processing a DCR for editing an unverified account according to one embodiment of the present invention. The process may start at 801.

At 803, a user may connect to the network 150, sign in the CRM 110, and then search for an account (e.g., a doctor).

At 805, an unverified account may be returned as a search result. The UI of the account may remind the user that the verification is not completed yet, as shown in FIGS. 7A and 7B.

At 807, the user may start to edit the unverified account, and an edit DCR may be created and sent to the CRM 110 (e.g., by the client application 121).

At 811, it may be determined if the previous DCR for creating the unverified account is rejected.

If yes, at 813, the edit DCR may be stamped with error, the result may be changed to "Rejected".

If the previous DCR for creating the unverified account has not been rejected, at 815, the edit DCR may be sent to the MDM 130 (e.g., by the DCR controller 1118) for validation.

The edit DCR may be verified in the MDM 130. In one implementation, a data steward may verify the data in the edit DCR from the user. At 821, it may be determined if the change is accepted in the MDM 130.

If yes, at 823, the verification result of the edit DCR may be changed to "Accepted".

If the change is not accepted in the MDM 130, at 825, the verification result of the edit DCR may be changed to "Rejected".

At 831, the master data in the MDM 130 may update the CRM record in the CRM 110 with data in the edit DCR.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for processing user requests for creating a new account in a customer relationship management ("CRM") system, the method comprising:
displaying a first user interface for receiving a first data change request ("DCR") for adding the new account to the CRM system in response to a request from a first user, wherein the first data change request comprises a first DCR line for a first type of account information of the new account, wherein the CRM system stores both verified data and unverified data;
receiving account information of the new account;
creating the first data change request and sending the first data change request to the CRM system;
determining that the first data change request involves a DCR-controlled field in the CRM system, wherein for data in the DCR-controlled field, a DCR is generated and sent to a master data management system ("MDM") system for verification for each data change and the data change is stored in the MDM system only when the verification is successful, wherein the MDM system manages master data, wherein the master data in the MDM system comprises verified data only, and wherein the master data is stored in DCR-controlled fields in the CRM system;
sending the first data change request to the MDM system over a network to verify the account information;
checking status of the verification in the master data management system;
creating an unverified account in the CRM system for the new account before verification of the account information of the new account in the MDM system is completed; and
recording user interactions with the unverified account in the CRM system before the verification in the MDM system is completed.

2. The method of claim 1, further comprising: determining that the verification in the MDM system is completed and updating the data change request with a status returned from the MDM system.

3. The method of claim 1, further comprising: creating a shadow account in the MDM in response to the first DCR.

4. The method of claim 3, further comprising: determining that the shadow account is accepted in the MDM system.

5. The method of claim 4, further comprising: determining that a new master record is created for the new account in the MDM system.

6. The method of claim 4, further comprising: determining that the shadow account is reconciled with an existing master record in the MDM system.

7. The method of claim 6, further comprising: determining that the master record exists in the CRM system.

8. The method of claim 7, further comprising: determining that the master record is aligned to the first user's territory in the CRM system.

9. The method of claim 8, further comprising: updating the CRM system with verification result from the MDM system.

10. The method of claim 4, further comprising: synchronizing the master record down to the CRM system from the MDM system if the unverified account is not reconciled with a master record in the MDM system, or the master record does not exist in the CRM system.

11. The method of claim 4, further comprising: informing the first user that the new account is verified and visible.

12. The method of claim 1, further comprising: displaying a status of the unverified account on a user interface of the unverified account.

13. The method of claim 1, further comprising: creating a second data change request for editing the unverified account.

14. The method of claim 13, further comprising: determining that the unverified account is rejected by the MDM system and stamping the second data change request with error.

15. The method of claim 13, further comprising: determining that the unverified account is not rejected by the MDM system and sending the second data change request to the MDM system for verification.

16. The method of claim 13, further comprising: determining that the second data change request is accepted by the MDM system and updating the CRM system.

17. The method of claim 13, further comprising: determining that the second data change request is rejected by the MDM system and update the second data change request to indicate that it is rejected.

18. A system for processing user requests for creating a new account in a customer relationship management ("CRM") system, the system comprising a DCR controller for:
receiving a first data change request ("DCR") for adding the new account to the CRM system, wherein the first data change request comprises a first DCR line for a first type of account information of the new account, and wherein the CRM system comprises a CRM server, wherein the CRM system stores both verified data and unverified data;
determining that the first data change request involves a DCR-controlled field in the CRM system, wherein for data in the DCR-controlled field, a DCR is generated and sent to a master data management system ("MDM") system for verification for each data change and the data change is stored in the MDM system only when the verification is successful, wherein the MDM system manages master data, wherein the master data in the MDM system comprises verified data only, and wherein the master data is stored in DCR-controlled fields in the CRM system;
sending the first data change request to the MDM system over a network to verify the account information;
checking status of the verification in the master data management system;
creating an unverified account in the CRM system for the new account before verification of the account information of the new account in the MDM system is completed; and
recording user interactions with the unverified account in the CRM system before the verification is completed.

19. The system of claim 18, wherein the DCR controller further determines that the unverified account is reconciled with the MDM system.

* * * * *